March 31, 1970    L. R. SUELZLE    3,504,264
VARIABLE DUTY CYCLE SWITCHING APPARATUS
Original Filed Dec. 19, 1966    2 Sheets-Sheet 1

INVENTOR.
LARRY R. SUELZLE
By White & Haefliger
ATTORNEYS.

INVENTOR.
LARRY R. SUELZLE
BY White & Haefliger
ATTORNEYS.

United States Patent Office 3,504,264
Patented Mar. 31, 1970

3,504,264
VARIABLE DUTY CYCLE SWITCHING APPARATUS
Larry R. Suelzle, Menlo Park, Calif., assignor to The J. C. Carter Company, Costa Mesa, Calif., a corporation of California
Continuation of application Ser. No. 603,018, Dec. 19, 1966. This application Nov. 8, 1968, Ser. No. 774,543
Int. Cl. H02m 3/22, 5/40
U.S. Cl. 321—2           8 Claims

ABSTRACT OF THE DISCLOSURE

The invention concerns improvements in switching control of power or voltage into a load. Switches such as gate controlled semiconductor devices are controlled in such manner that load current can be turned off from a load-carrying switch without requiring control or commutation current to flow through that switch. This mode of operation is enabled by using the load carrying switch in series with a second switch through which commutation current flows. Variable duty cycle apparatus is thereby provided, with the capability of being varied between zero and unity duty cycle.

---

Figure 1:
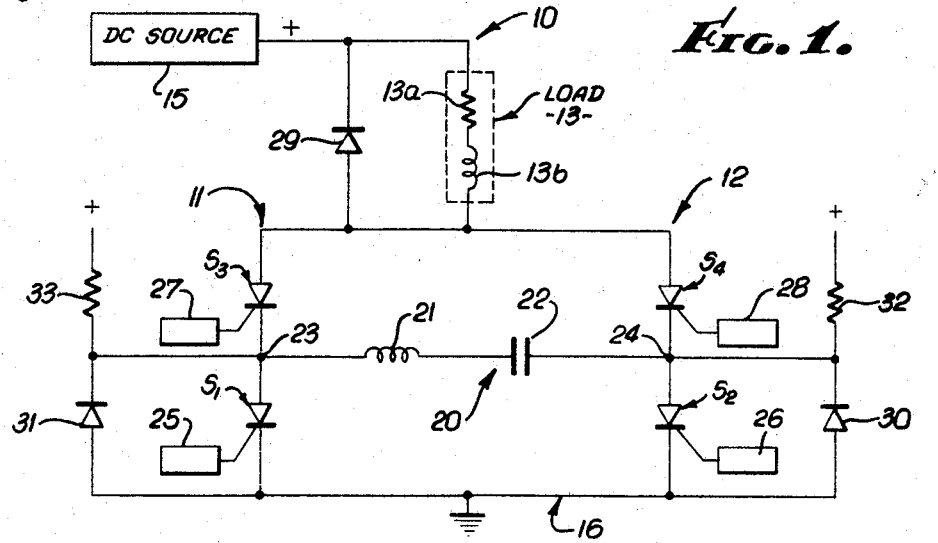

This is a continuation of application Ser. No. 603,018, filed Dec. 19, 1966.

This invention relates generally to electrical power control systems and more particularly concerns improvements in periodic or nonperiodic duty cycle methods of controlling the voltage or the power supplied to a load.

While there have been many attempts to achieve desired switching controls of power or voltage into a load, none of those of which we are aware provide the unusually advantageous features of construction and mode of operation, as well as the unusual results, afforded by the present invention. For example, the present invention significantly simplifies power or load control circuitry and mode of operation, as by requiring fewer gate controlled rectifiers. Other unusual advantages will appear in the detailed description which follows.

Typically, the invention embodies a network forming at least two parallel legs used alternately to conduct load current, one leg including switches $S_1$ and $S_3$ connected in series to conduct in the same direction and the other leg including switches $S_2$ and $S_4$ connected in series to conduct in the same direction, switches $S_1$ and $S_2$ being in on and off states respectively during the first time interval and being in off and on states respectively during a second time interval; further, switch $S_3$ is in a conducting state only during a selected portion of the first time interval that continues until the turn off of $S_1$ and switch $S_4$ is in a conducting state only during a selected portion of the second time interval that continues until the turn off of $S_2$, and the invention includes means operable to place the two switches in those various states. As a result, a highly advantageous variable duty cycle device is provided, with the capability of being varied between zero and unity duty cycle, and with switching elements that may have relatively long rise times, long fall times, or long recovery times. Also, this technique allows greater flexibility in controlling the conduction period and is especially advantageous when short conduction periods are required.

A conduction leg comprises switches which are series-connected to provide flexibility and simplicity in controlling the conduction of load current through the leg, and not for the purpose of providing operation at a larger voltage than that under which a single switch can operate.

Further in accordance with the invention, the switches may typically comprise gate controlled semiconductor switches, as for example, gate controlled rectifiers such as silicon controlled rectifiers, or SCR's; the above-mentioned means to place the switches in their on and off states typically includes a path containing series inductance and capacitance connected between the network legs at points respectively between $S_1$ and $S_3$ and between $S_2$ and $S_4$, thereby to apply a reverse polarity potential operable to turn off $S_1$ and $S_2$ at the end of their respective conduction periods; and the means to place the switches in their conductive states at the controllable times during the first and second time intervals typically includes control means connected with the gates of $S_1$, $S_2$, $S_3$ and $S_4$.

As will appear, load current can be turned off from a load-carrying SCR without requiring control or commutation current to flow through the latter SCR, this being the result of using the load carrying SCR in series with a second SCR through which commutation current flows.

Figure 2:
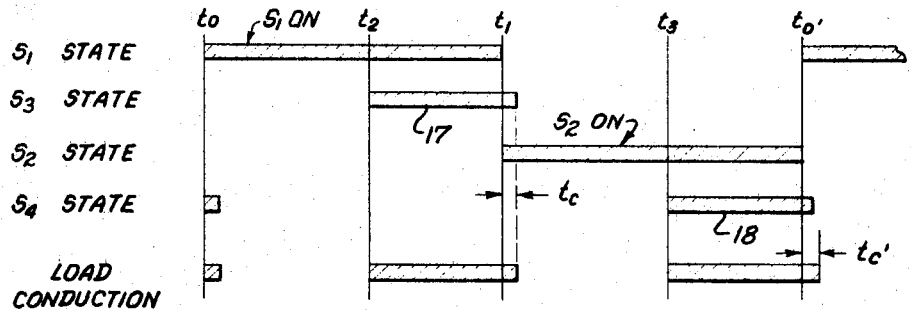
Figure 3:
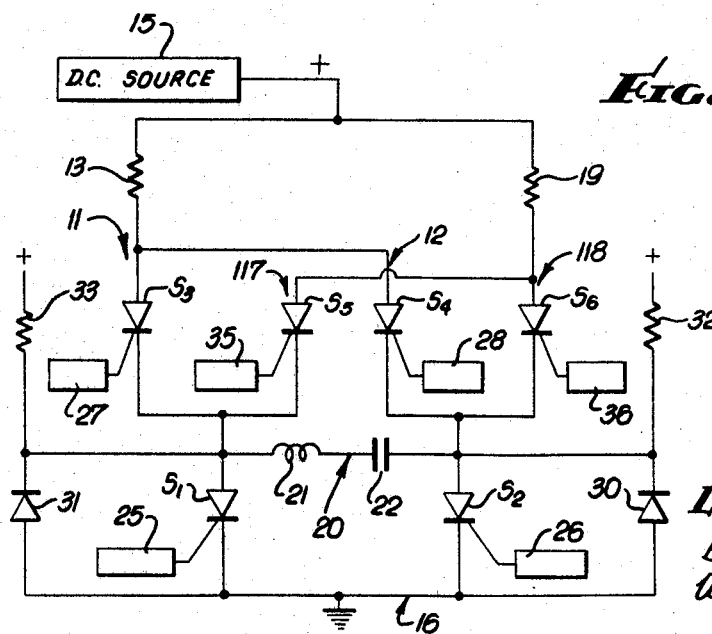
Figure 4:
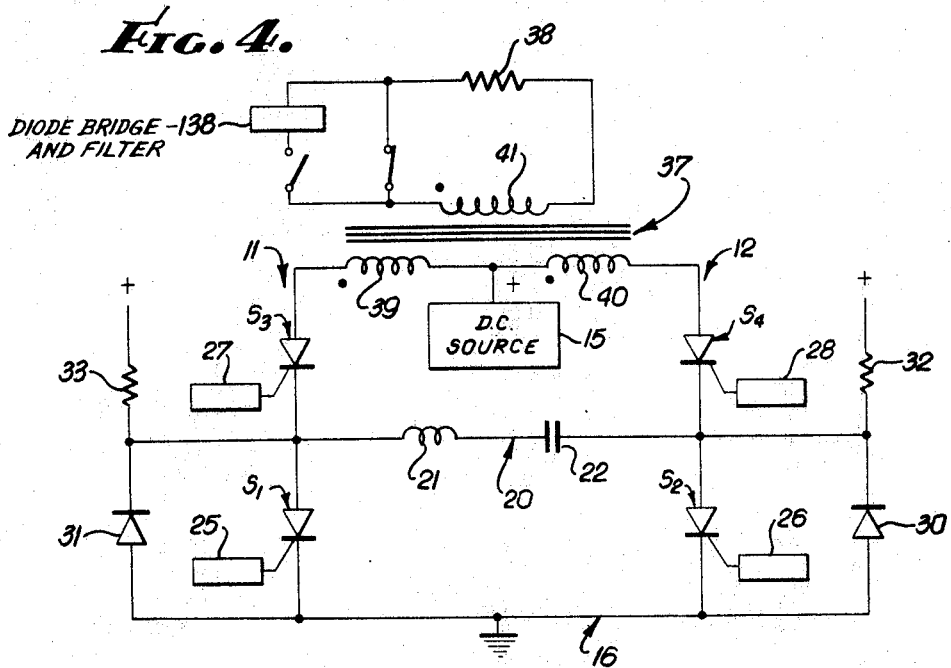
Figure 5:
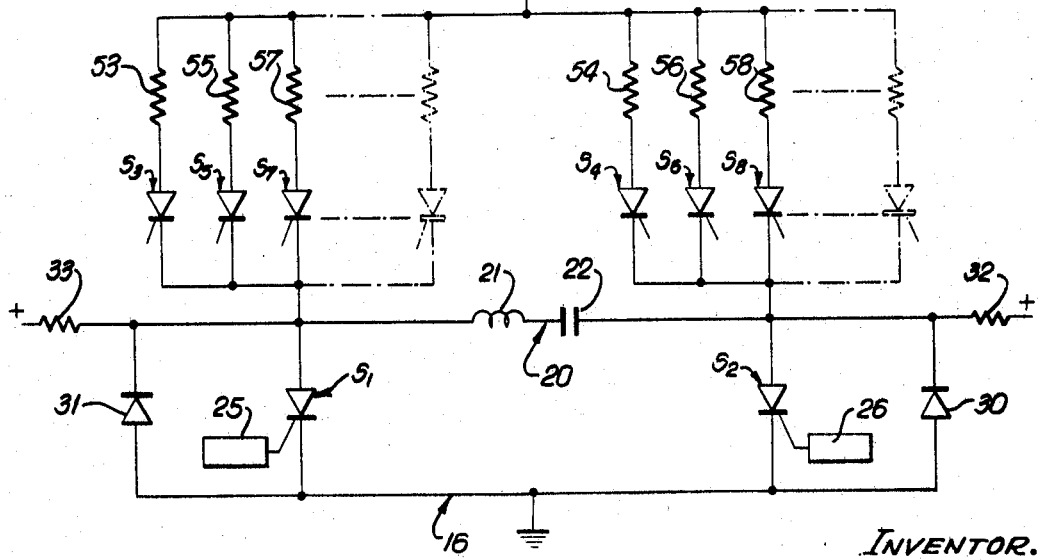

These and other objects and advantages of the invention as well as the details of illustrative embodiments, will be more fully understood from the following detailed description of the drawings, in which:

FIG. 1 is a circuit diagram showing one form of the invention;
FIG. 2 is a diagram showing on and off states of the switches in FIG. 1;
FIG. 3 is a modified form of the FIG. 1 circuit; and
FIGS. 4 and 5 are further modified forms of the FIG. 1 circuit.

Referring first to FIG. 1, the network 10 forms two parallel legs 11 and 12 adapted to conduct load current alternately, as through load 13. Load 13 may have an inductive component 13b in addition to the resistive component 13a. A source of D.C. current is shown at 15, and it is clear that the legs 11 and 12 are connectible in series between the load and ground terminal 16. The voltage fly-back control diode 29 is typically connected across the load when the load contains an inductive component 13b. Leg 11 includes load carrying switches $S_1$ and $S_3$ connected in series to conduct in the same direction, and likewise, leg 12 includes load carrying switches $S_2$ and $S_4$ connected in series to conduct in the same direction. The switches typically comprise gate controlled rectifiers, such as silicon controlled rectifiers, or SCR's, these being PNPN semiconductor devices.

Extending the description to FIG. 2, it will be seen that switchese $S_1$ and $S_2$ are in on and off states respectively during the first time interval $t_0$ to $t_1$, and they are in off and on states respectively during the second time interval $t_1$ to $t_0'$. The two time intervals comprise one cycle, the length of which is controlled as will appear, and the cycle is repeated starting with time $t_0'$. Also from FIG. 2, a switch $S_3$ is in conducting state 17 only during a selected portion ($t_2$ to $t_1$) of the first time interval and continues for a short time interval $t_c$ after the time $t_1$. The time interval $t_c$ is typically much smaller than the intervals $t_0$ to $t_1$, and arises from the commutation interval as will be made apparent in a discussion to follow. Switch $S_1$ is turned off by applying a reverse polarity at junction 23; Similarly, switch $S_4$ is in the conducting state 18 only during a selected portion ($t_3$ to $t_0'$) of the second time interval and continues for a short time interval $t_c'$ after the time $t_0'$. Switch $S_2$ is turned off by applying a reverse polarity at the junction 24 at time $t_0'$. The commencement of the time portions 17 and 18 at $t_2$ and $t_3$ respectively is controllable, so that $t_2$ may occur between $t_0$ and $t_1+t_c$ and $t_3$ may occur anywhere between $t_1$ and $t_0'+t_c'$. As a result, the network has a variable duty cycle, with the capability of being varied between zero and unity duty cycle, and each leg 11 and 12 may have a conductive interval independent of the other leg.

Referring back to FIG. 1, the means to control the states of the switches typically include a path 20 containing series connected inductance 21 and capacitance 22 connected between legs 11 and 12 at junction points 23 and 24 respectively, between $S_1$ and $S_3$ and between $S_2$ and $S_4$. Capacitance 22 is initially charged to a potential as for example by rendering $S_1$ conductive by means of controllable source 25, which then charges the capacitance through resistance 32. The polarity of the potential across the capacitance will be such that the more positive potential is at the junction 24. Once the capacitance is charged, $S_2$ may be rendered conductive by means of controllable source 26. Capacitance 22 then discharges through path 30, switch $S_2$ and diode 31. The deverse polarity at junction 23 turns off $S_1$. In discharging through the inductance 21, a magnetic field will be built up around the inductance which, upon collapsing, will cause a reverse polarity potential to build up cross capacitor 22. The time $t_c$ for this commutation to occur is approximately $\pi\sqrt{LC}$, where L and C are the inductance and capacitance values of impedances 21 and 22, respectively. The energy lost during this commutation interval may typically be stored to the capacitance 22 by current through resistance 33 or by other means when no load current has been flowing. If $S_3$ had been conducting when the commutation interval was initiated by rendering $S_2$ conductive, $S_3$ would have remained conductive until the end of the commutation interval where $S_1$ is off and the potential at the junction 23 becomes as positive as or more positive than the source potential 15. When $S_3$ has been in a conductive state the energy is restored to the capacitance 22 by means of the flow of some load current through $S_3$, leg 20, and $S_2$.

With $S_2$ in a conductive state, $S_4$ may be rendered conductive by controllable source 28; load current is then conducted through leg 12. At some time later, $S_1$ is rendered conductive by controllable source 25; this is typically at the time $t_0'$. $S_2$ is turned off by the reverse potential at junction 24 due to the discharge current of capacitance 22 flowing through $S_1$, path 20, and diode 30. As a result $S_4$ will be turned off at the completion of this commutation interval. Thus $S_1$ and $S_2$ are alternately rendered conductive to produce the intervals $t_0$ to $t_1$ and $t_1$ to $t_0'$ respectively. When $S_1$ is turned on, $S_2$ is turned off; and when $S_2$ is turned on, $S_1$ is turned off.

An importantly unique feature of this circuit is the isolation between the conduction of load current and the commutation between the on and off and the off and on states of the SCR switches $S_1$ and $S_2$ respectively. $S_1$ and $S_2$ can continue to commutate even though no load current is being conducted. When load current is being conducted by $S_3$ or $S_4$ in the appropriate time interval, the turn off of $S_3$ or $S_4$ occurs without the necessity of the commutation current flowing through $S_3$ or $S_4$, since the load current must also flow through the commutating SCR switches $S_1$ and $S_2$. The simplicity and flexibility resulting from this mode of operation justifies the small added power loss from the requirement that the load current flow through the switches rather than through a single switch. As will be seen later, this method of controlling and turning off an SCR switch carrying load current without the necessity for this switch to carry commutation current, enables additional loads and switches to be added to the basic commutating SCR switches $S_1$ and $S_2$.

In addition, the means to control the states of the switches typically include control means 25, 26, 27, and 28 respectively connected with the gates of $S_1$, $S_2$, $S_3$ and $S_4$. The controls 25, 26, 27 and 28 may include trigger signal sources, which are themselves well known, and the timing of such signals may be controllable as needed for the conductive duty cycle desired for the load 13.

Referring now to FIG. 3, the elements of FIG. 1 incorporated therein bear the same numerals. In this circuit, two additional SCR switches, $S_5$ and $S_6$, are added to conduct current to another load 19. Current through load 19 is conducted alternately through path 117, consisting of the series connected switches $S_5$ and $S_1$, and through path 118, consisting of the series connected switches $S_6$ and $S_2$. The mode of operation for paths 117 and 118 is the same as that of paths 11 and 12 in the circuit of FIG. 1 in which the on and off states of $S_1$ and the off and the on states of $S_2$ define the first and second time intervals respectively. The commutation of $S_1$ and $S_2$ at the ends of the first and second intervals leads to the turn off of $S_3$ and $S_5$, and $S_4$ and $S_6$, respectively. The advantage of using this circuit over a circuit like FIG. 1 for each load is in the reduction of the number of switches and control circuits.

In the circuit of FIG. 3, if SCR switches $S_4$ and $S_5$ are removed, we obtain a version of the two-load circuit where the current can only flow through the load 13 during the first time interval, and through load 19 during the second time interval. As can be seen, with this mode of operation the current to either load need not pass alternately through two parallel paths if a half-cycle or less conduction period is suitable.

This half-cycle operation to each of two loads may be extended as in FIG. 4 to a transformer-coupled load. In this circuit the loads 13 and 19 of FIG. 3 are replaced by the windings 39 and 40 respectively of a center-tap primary winding of transformer 37 where the load 38 is connected to the secondary winding 41. This DC-AC inverter can be made into a DC—DC converter by connecting a diode bridge and filter 138 between the secondary 41 and the load 38.

In the circuit of FIG. 5, the elements of FIG. 1 incorporated therein bear the same numerals. More SCR switches and loads may be added to the basic commutating pair, $S_1$ and $S_2$, in a fashion similar to the circuits discussed in conjunction with FIG. 3. For the circuit of FIG. 5 conduction of current through $S_3$, $S_5$, $S_7$, etc., can occur only during the "on" period of $S_1$ (the first time interval) and similarly conduction of current through $S_4$, $S_6$, $S_8$, etc., can occur only during the "on" period of $S_2$ (the second time interval). The turn off of $S_3$, $S_5$, $S_7$, etc., and the turn off of $S_4$, $S_6$, $S_8$, etc., occur when $S_1$ and $S_2$ respectively are turned off. Resistances 53–58 are connected in series with various of the switches $S_3$–$S_8$, as indicated.

I claim:

1. DC to DC conversion apparatus of the character described, comprising a network forming at least two parallel legs to conduct current alternately, one leg including switches $S_1$ and $S_3$ connected in series to conduct in the same direction and the other leg including switches $S_2$ and $S_4$ connected in series to conduct in the same direction, switches $S_1$ and $S_2$ being in on and off states respectively during a first time interval and being in off and on states respectively during a second time interval, switch $S_3$ being in a conducting state during a selected portion of the first time interval that continues approximately until $S_1$ is turned off and switch $S_4$ being in a conducting state during a selected portion of the second time interval that continues approximately until $S_2$ is turned off, a load having a terminal directly electrically connected in series sequence with $S_3$ and $S_1$ and also in series sequence with $S_4$ and $S_2$, a current supply element electrically connected in series with said legs, and means electrically connected to said switches to place said switches in said states during said intervals and for controlling the durations of said selected portions of said intervals, said switches comprising load current carrying gate controlled rectifiers, said means including controls connected with the gates of $S_1$, $S_2$, $S_3$ and $S_4$ to supply trigger signals thereto, said controls for the gates of $S_3$ and $S_4$ being operable to turn $S_3$ and $S_4$ on at independently controllable times respectively within said first and second time intervals, whereby the durations of said selected portions of said first and second time intervals are independently controllable relative to one another and also relative to said first and second time intervals respectively, said means includes a path containing series connected inductance and capacitance connected between said legs at points respectively between $S_1$ and $S_3$ and between $S_2$ and $S_4$, thereby to apply a reverse polarity potential operable to turn off $S_1$ and $S_2$ at the end of their respective conduction periods, resistances electrically connected to said points and through which current is supplied to charge said capacitor, and diodes connected across $S_1$ and $S_2$ whereby reverse polarity to turn off $S_1$ is developed by discharge of the capacitor through $S_2$ and the diode connected across $S_1$, and reverse polarity to turn off $S_2$ is developed by discharge of the capacitor through $S_1$ and the diode connected across $S_2$.

2. Apparatus as described in claim 1, wherein said load comprises a single resistance load.

3. Apparatus as described in claim 1, wherein said load comprises two resistive loads respectively connected in series with $S_3$ and $S_4$.

4. DC to DC conversion apparatus of the character described, comprising a network forming at least two parallel legs to conduct current alternately, one leg including switches $S_1$ and $S_3$ connected in series to conduct in the same direction and the other leg including switches $S_2$ and $S_4$ connected in series to conduct in the same direction, switches $S_1$ and $S_2$ being in on and off states respectively during a first time interval and being in off and on states respectively during a second time interval, switch $S_3$ being in a conducting state during a selected portion of the first time interval that continues approximately until $S_1$ is turned off and switch $S_4$ being in a conducting state during a selected portion of the second time interval that continues approximately until $S_2$ is turned off, a load electrically connected with $S_3$ and $S_1$ and also with $S_4$ and $S_2$, a current supply element electrically connected in series with said legs, and means electrically connected to said switches to place said switches in said states during said intervals and for controlling the durations of said selected portions of said intervals, said switches comprising load current carrying gate controlled rectifiers, said means including controls connected with the gates of $S_1$, $S_2$, $S_3$ and $S_4$ to supply trigger signals thereto, said controls for the gates of $S_3$ and $S_4$ being operable to turn $S_3$ and $S_4$ on at independently controllable times respectively within said first and second time intervals, whereby the durations of said selected portions of said first and second time intervals are independently controllable relative to one another and also relative to said first and second time intervals respectively, said means including a path containing series connected inductance and capacitance connected between said legs at points respectively between $S_1$ and $S_3$ and between $S_2$ and $S_4$, thereby to apply a reverse polarity potential operable to turn off $S_1$ and $S_2$ at the end of their respective conduction periods, resistances electrically connected to said points and through which current is supplied to charge said capacitor, and diodes connected across $S_1$ and $S_2$ whereby reverse polarity to turn off $S_1$ is developed by discharge of the capacitor through $S_2$ and the diode connected across $S_1$, and reverse polarity to turn off $S_2$ is developed by discharge of the capacitor through $S_1$ and the diode connected across $S_2$.

5. An apparatus of the character described, comprising a network forming at least two parallel legs to conduct current alternately, one leg including switches $S_1$ and $S_3$ connected in series to conduct in the same direction and the other leg including switches $S_2$ and $S_4$ connected in series to conduct in the same direction, switches $S_1$ and $S_2$ being in on and off states respectively during a first time interval and being in off and on states respectively during a second time interval, switch $S_3$ being in a conducting state only during a selected portion of the first time interval that continues approximately until $S_1$ is turned off and switch $S_4$ being in a conducting state only during a selected portion of the second time interval that continues approximately until $S_2$ is turned off, two loads respectively connected in series with $S_3$ and $S_4$, the loads being electrically connectible with current source means, a switch connected between the first load and switch $S_2$ to conduct in the same direction as switch $S_3$, whereby the conduction duty cycle for this first load connected with $S_3$ is converted to full duty cycle conduction capability, and including a switch connected between the second load and $S_1$ to conduct in the same direction as $S_4$, whereby the conduction duty cycle for this second load connected with $S_4$ is converted to full duty cycle conduction capability.

6. An apparatus of the character described, comprising a network forming at least two parallel legs to conduct current alternately, one leg including switches $S_1$, $S_3$ and $S_5$, switches $S_3$ and $S_5$ connected in parallel with their outputs connected to switch $S_1$ so that $S_1$, $S_3$ and $S_5$ conduct in the same direction, the other leg including switches $S_2$, $S_4$ and $S_6$, switches $S_4$ and $S_6$ connected in parallel with their outputs connected to switch $S_2$ so that $S_2$, $S_4$ and $S_6$ conduct in the same direction, switches $S_1$ and $S_2$ being in on and off states respectively during a first time interval and being in off and on states respectively during a second time interval, each of switches $S_3$ and $S_5$ being in conductive state during selected portions of the first time interval that continue approximately until $S_1$ is turned off, each of switches $S_4$ and $S_6$ being in conductive state during selected portions of the second time interval that continue approximately until $S_2$ is turned off, a load electrically connected in series with switches $S_3$ and $S_4$ and another load electrically connected in series with switches $S_5$ and $S_6$, current supply means electrically connected in series with said legs, and means electrically connected to the switches to place the switches in said states during said intervals and for controlling the durations of said selected portions of said intervals.

7. Apparatus as defined in claim 6, in which said switches comprise load carrying gate controlled rectifiers, $S_1$ and $S_2$ being turned off by commutating current applied at the inputs thereto via an intervening network, $S_3$ and $S_5$ being turned off in response to turn-off of $S_1$, and $S_4$ and $S_6$ being turned off in response to turn-off of $S_2$.

8. Apparatus as defined in claim 7 in which said last named means includes individually operable controls connected with the gates of said rectifiers to supply trigger signals thereto to place $S_3$, $S_4$, $S_5$ and $S_6$ in conductive states at controllable times during said intervals.

References Cited

UNITED STATES PATENTS

| | | | |
|---|---|---|---|
| 3,207,974 | 9/1965 | McMurray | 321—45 |
| 3,260,919 | 7/1966 | Kleiner | 321—18 |
| 3,348,124 | 10/1967 | Cielo. | |
| 3,384,804 | 5/1968 | Salihi. | |
| 3,101,439 | 8/1963 | Lilienstein et al. | 321—45 |
| 3,315,144 | 4/1967 | Poss | 321—45 X |

J. D. TRAMMELL, Primary Examiner

W. H. BEHA, JR., Assistant Examiner

U.S. Cl. X.R.

321—16, 45